United States Patent [19]
Swidwa et al.

[11] Patent Number: 4,511,531
[45] Date of Patent: Apr. 16, 1985

[54] TRANSFER OF NUCLEAR REACTOR COMPONENT ASSEMBLIES

[75] Inventors: Kenneth J. Swidwa, Harmar Township, Allegheny County; Leonard P. Hornak, North Huntingdon; Edward F. Kowalski, Pittsburgh, all of Pa.

[73] Assignee: Westinghouse Electric Corp., Pittsburgh, Pa.

[21] Appl. No.: 366,631

[22] Filed: Apr. 8, 1982

[51] Int. Cl.³ .............................................. G21C 19/10
[52] U.S. Cl. .................... 376/262; 376/271; 294/906; 403/321
[58] Field of Search ............... 376/260, 261, 262, 264, 376/268, 269, 270, 271; 294/86 A, 93; 403/321, 322, 326, 330

[56] References Cited

U.S. PATENT DOCUMENTS

| | | | |
|---|---|---|---|
| 3,421,635 | 1/1969 | Burger | 376/271 |
| 3,691,011 | 9/1972 | Kruger et al. | 376/261 X |
| 3,768,668 | 10/1973 | Schukei | 214/27 |
| 3,863,770 | 2/1975 | Shellenberger et al. | 376/271 X |
| 3,909,350 | 9/1975 | Dupuy | 214/18 N |
| 3,936,089 | 2/1976 | Hoffmeister | 294/86 A |
| 3,938,845 | 2/1976 | Fehl | 294/86 A |
| 3,941,259 | 3/1976 | Hoffmeister | 214/27 |
| 3,945,514 | 3/1976 | Dose | 214/27 |
| 3,950,020 | 4/1976 | Hoffmeister | 294/86 A |
| 3,967,741 | 7/1976 | Hoffmeister | 214/27 |
| 3,978,957 | 9/1976 | Hoffmeister | 193/1 |
| 3,990,591 | 11/1976 | Street | 214/87 |
| 4,030,973 | 6/1977 | Hoffmeister | 376/260 X |
| 4,086,132 | 4/1978 | Meuschke | 376/261 X |
| 4,279,699 | 7/1981 | Kuhn | 294/86 A |
| 4,311,557 | 1/1982 | Kowalski | 376/271 |

Primary Examiner—Richard E. Schafer
Assistant Examiner—Daniel Wasil
Attorney, Agent, or Firm—D. C. Abeles

[57] ABSTRACT

Apparatus for transferring, not only the fuel assemblies, but other component assemblies including control-rod assemblies, thimble-plug assemblies, poison assemblies and the like during refueling of a nuclear reactor. The apparatus includes an outer mast for guiding and protecting the component assemblies which are transferred, an inner mast movable vertically within the guiding mast. The inner mast has grippers for engaging and lifting or lowering fuel assemblies. The outer mast has internal grooved rollers along its length. The inner mast is formed at oppositely facing channels held in a rigid assembly by plates to which the channels are secured. Opposite corners formed by the flanges and the webs of the channels penetrate into the grooves of the rollers and the inner mast is guided and held in position by the rollers. The apparatus also includes an elongated tube within the inner mast movable vertically relative to the inner mast. The tube has a grapple or gripper for engaging and lifting or lowering the component assemblies other than the fuel assemblies. The tube is penetrated by an actuator rod which locks the grapple to the component assemblies. The tube is driven upwardly or downwardly by a winch. The tube carries a primary set of lugs. The inner mast has a plate with an opening through which the lugs pass when the tube alone is driven upwardly. The plate carries a pivotal yoke which is movable between a first or closed position in which the yoke extends over the opening and a second or open position when it does not extend over the opening. In the closed position the yoke is engageable by the primary lugs so that when the tube is raised the inner mast is also raised. The tube also has secondary lugs. The inner mast carries a stop engageable by the secondary lugs when the tube is in a vertical position in which it has raised a component assembly within the masts. The engagement of the secondary lugs and plate serves to pull the inner mast into the guiding mast.

8 Claims, 26 Drawing Figures

TRANSFER OF NUCLEAR REACTOR COMPONENT ASSEMBLIES

BACKGROUND OF THE INVENTION

This invention relates to the art of nuclear power plants and it has particular relationship to the transfer of component assemblies of a nuclear reactor during a refueling operation. The expression "refueling operation" as used in this application means an operation during which component assemblies are transferred to and from a reactor for replacement by other assemblies or during which selected component assemblies, for example a fuel assembly, is moved from one position in a reactor to another position in a reactor.

U.S. Pat. No. 4,311,557 granted Jan. 19, 1982 to Edward F. Kowalski, Kenneth J. Swidwa and Leonard P. Hornak for *Refueling Machine for a Nuclear Reactor* and assigned to Westinghouse Electric Corporation (herein Kowalski), discloses apparatus for transferring fuel assemblies during a refueling operation. The apparatus disclosed in Kowalski operates entirely satisfactorily. However, during a refueling operation it is frequently necessary to transfer other component assemblies of a reactor than the fuel assemblies. Among these assemblies are the control-rod assemblies or clusters and thimble-plug assemblies. Preparatory to a refueling operation the control rods are inserted in the fuel assemblies to set the reactor in a non-critical state. A solution of a material, such as a compound of boron$^{10}$, having a high neutron absorption cross section is then injected into the coolant. The control rods may now be removed from the fuel assemblies when it is desirable that the control-rod assembly be removed from a fuel assembly that is to be transferred. In some cases the control-rod assembly is transferred to a different position than the fuel assembly. Some fuel assemblies do not contain fuel rods. Instead the control-rod thimbles are closed by plugs so that the coolant flow is maintained uniform through all fuel assemblies. It is sometimes necessary that the plug assemblies be transferred. It is then necessary that apparatus be provided for transferring, not only the fuel assemblies, but also other component assemblies, such as those mentioned above.

In accordance with the teachings of the prior art (for example, Kuhn U.S. Pat. No. 4,279,699, Kruger U.S. Pat. No. 3,691,011) apparatus for transferring both fuel assemblies and other component assemblies includes within a guiding mast, an inner mast for transferring fuel assemblies within which there is an elongated member for transferring other component assemblies. The elongated member is driven upwardly and downwardly by a winch or the like. To selectively drive the inner mast, the elongated member is provided with latches. The latches are actuable to be engaged with cooperative members on the inner mast when the inner mast is to be raised. This occurs when a fuel assembly is to be transferred. When only the elongated member is to be raised, the latches are set to remain disengaged from the cooperative members on the inner mast.

This prior art structure demands that a plurality of latches be movably mounted on the longitudinal member. The latches are dimensioned to be accommodated on the longitudinal member within the region between the longitudinal member and the inner mast. Difficulty and high cost has been experienced in the fabrication, assembly on the longitudinal member, and maintenance of the latches. The weight of these latches has also been found to be a negative factor. Notwithstanding that the thickness of these latches is substantial, it has been found that they must be constructed of exotic material, for example, age-hardened stainless steel.

Another problem presented by prior art involves the stability of the inner mast as it is raised or lowered. This involves the cooperative functioning of the guiding mast and the inner mast. Hoffmeister U.S. Pat. No. 3,978,957, which is typical of the prior art, discloses fuel-assembly transfer apparatus in which the mast which raises the fuel assembly is of rectangular cross section and is guided by rollers along a guiding mast. At each guiding position, pairs of rollers engage plates along opposite corners of the rectangular mast. This structure is costly, complicated and difficult to install and maintain. At each guiding position a pair of rollers must be mounted and maintained so that their guiding operation is appropriately coordinated. The guiding function is not positive since the rollers at a corner may become displaced with reference to each other.

It is an object of this invention to overcome the above-described disadvantages and drawbacks of the prior art and to provide apparatus for transferring both fuel assemblies and other component assemblies of a reactor during refueling, the coordinated movement of whose raising mechanisms shall be carried out with parts composed of non-exotic, relatively low-cost materials, whose parts are readily fabricated and assembled and which are readily maintainable. It is also an object of this invention to provide such apparatus including guiding means, of simple structure which shall be readily installed and maintained, for the inner mast which carries the fuel assemblies, which guiding means shall be of simple structure and which shall be composed of a minimum of relatively low-cost parts.

SUMMARY OF THE INVENTION

In accordance with this invention, apparatus is provided for transferring both fuel assemblies and other component assemblies of a nuclear reactor during refueling in which the latches on the inner elongated directly-driven member are eliminated. The elongated member includes fixed projection means, typically lugs, at an appropriate position along its length. The elongated member is telescoped into an inner mast which is vertically movable along an outer mast. The inner mast includes a mechanism of relatively simple structure, typically a yoke, which is selectably actuable to be interposed in the path of the projection means, i.e., closed, or to be moved out of the path of the projection means, i.e., opened. When the mechanism is closed and is in the path of the projection means, the inner mast is raised by the raising of the elongated member. When the mechanism is opened out of the path of the projection means, only the elongated member is raised. When the apparatus is at rest, the mechanism is closed. The elongated member then supports the inner mast unless the inner mast rests an auxiliary or secondary stop lugs on the elongated member or during operation rests on parts of the core.

The projection means which are typically lugs are of simple structure and may be composed of ordinary type 300 stainless steel. The selectably actuable means, typically a yoke, is also of simple structure which may be fabricated from ordinary stainless steel. The assembly and maintenance of the actuable means on the inner mast presents no serious problems.

The inner mast is of generally polygonal cross section having corners at the intersections of the side walls. An advantageous structure of this type is formed by a rigid assembly including a pair of oppositely disposed channel structural members with their flanges inwardly. The channels are secured to plates which extend along the lengths of the channels. The channels and plates form a rigid structure of rectangular cross section. Grooved rollers extend along the internal surface of the guiding mast. The corners of the inner mast extend into the grooves of the rollers and the inner mast is guided by the rollers. This guiding structure is simple and stable and is readily installed and maintained.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

With reference to FIGS. 5A, 5B and 5C, FIG. 5C shows the top part of the coordinated assembly, FIG. 5B, the intermediate part and FIG. 5A, the bottom. The bottom of FIG. 5B extends from the bottom of FIG. 5C and the bottom of FIG. 5 extends from the top of FIG. 5B.

DETAILED DESCRIPTION OF THE EMBODIMENT

Figure 1:
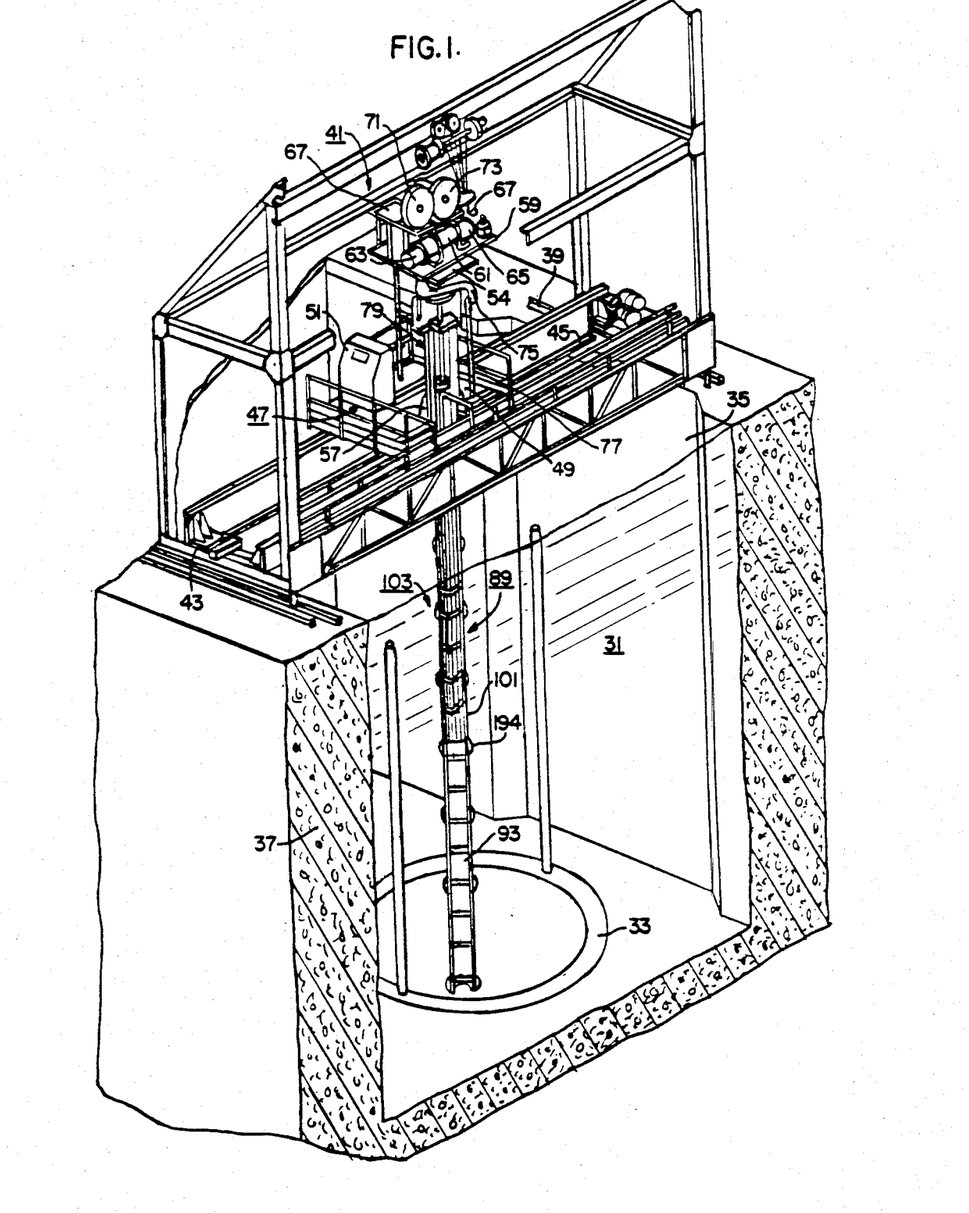
FIG. 1 is a view in perspective of apparatus in accordance with this invention shown in its relationship to the part of a nuclear reactor power plant in which it is used.

FIG. 1 shows the pit 31 of a nuclear reactor power plant during refueling. A reactor 33 is in the base of this pit. It is shown with its cover or bell removed. The pit 31 is filled with water 35. The water contains a component of boron$^{10}$ or of other elements having a high neutron-absorption cross section. The pit has opposite concrete walls 37 on which tracks 39 are provided. A supporting bridge 41 extends between the walls 37 and is movable on wheels (not shown) along tracks 39. The supporting bridge 41 has a metal frame which, at each end, includes trucks 43 formed of back-to-back channel sections for supporting the wheels. A track 45 rests on a beam extending between the trucks 43. This track 45 is perpendicular to track 39. A trolley 47 is movable on wheels (not shown) along the tracks. A coordinated assembly 49 (FIGS. 5A, 5B, 5C) for transferring component assemblies of the reactor 33 is suspended by the trolley 47 in the pit 31. A control console 51 including a computer is disposed on the trolley 47. The trolley accommodates the personnel which operate the refueling apparatus with the aid of the computer.

Figure 10:
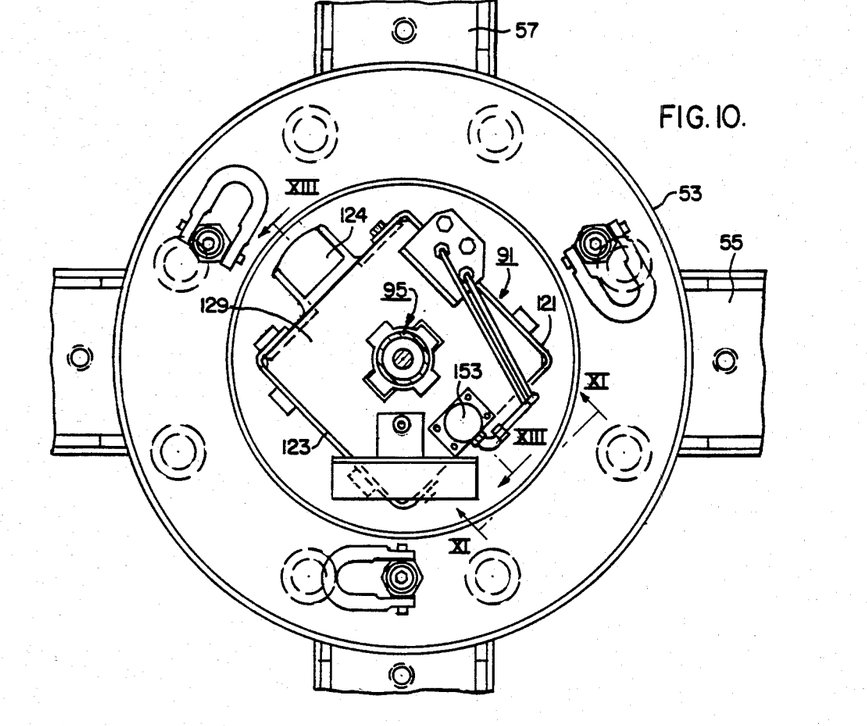
FIG. 10 is a view in transverse section taken along line X—X of FIG. 5C.

The coordinated assembly 49 includes a main support mast 53 (FIG. 10). A rectangular plate 54 is welded to the top of mast 53. A winch assembly including a winch 61 and its drive 63 and speed reducer 65 and brake are mounted on platform 59 bolted to plate 54. A C bracket 67 on which a reel 71 for an air hose (not shown) and a reel 73 for the electrical cable (not shown) for a TV camera (not shown) are bolted to plate 54. There are also additional brackets and reels (not shown) for other conductors. The reels 71 and 73 permit the base and electrical cables to be let out as the parts of the coordinates assembly 49 move downwardly and to be pulled in when these parts are retracted upwardly. The air and electrical conductors are assembled into a flexible CATRAC cable tray 75 which passes around the outside of the support mast 53 and down through an angle 77 extending from the trolley 47. With this arrangement of the cable tray, the cable tray moves towards the support mast 53 or away from it when the mast is rotated, to orient properly the component-assembly engaging parts, without twisting the air and electrical conductors below the mast 53.

There is also an auxiliary support mast 79 (FIGS. 1, 5B, 5C, 8, 9, 10). This mast 79 has opposite brackets 55 and 57 by means of which it is supported on the deck of the trolley 47. The auxiliary support mast 79 has a flange 83 at the top which carries a race 85 (FIG. 5C) of thrust bearings. The main support mast 53 is connected to a ring 87 which is also connected to the guiding mast 89. The ring 87 carries a seat for the bearing race 85. The main support mast 53 is thus rotatable on the auxiliary support mast 79 and carries with it the guiding mast 89 and the parts connected to it.

Figure 16:
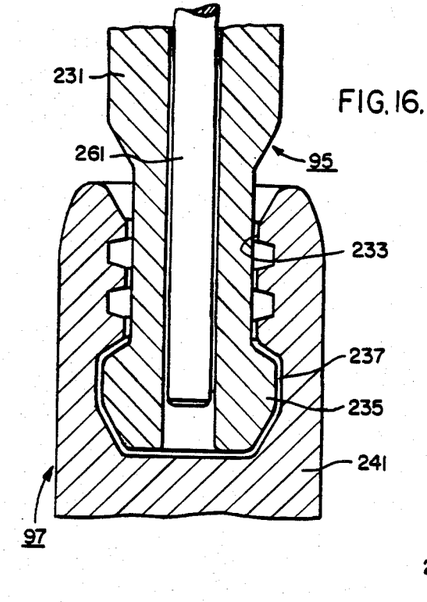
FIG. 16 is a fragmental view in longitudinal section with the actuator rod unsectioned showing the manner in which the grapple for a component assembly, other than a fuel assembly, engages a control-rod assembly.
Figure 17:
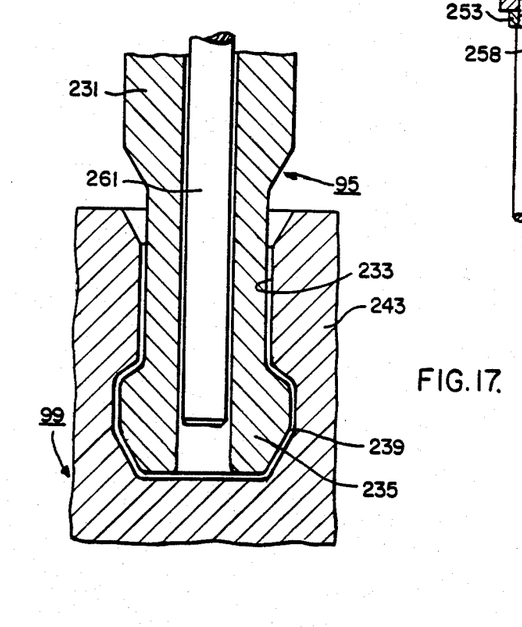
FIG. 17 is a like fragmental view showing how the grapple engages a thimble-plug assembly.

The coordinated assembly 49 also includes, in addition to the guiding mast 89, an inner mast 91 (FIGS. 2, 5A, 5C) for raising fuel assemblies 93 and an elongated member 95 for raising component assemblies other than the fuel assemblies, e.g., control-rod assemblies 97 (FIG. 16) and thimble-plug assemblies 99 (FIG. 17).

Figure 5A:
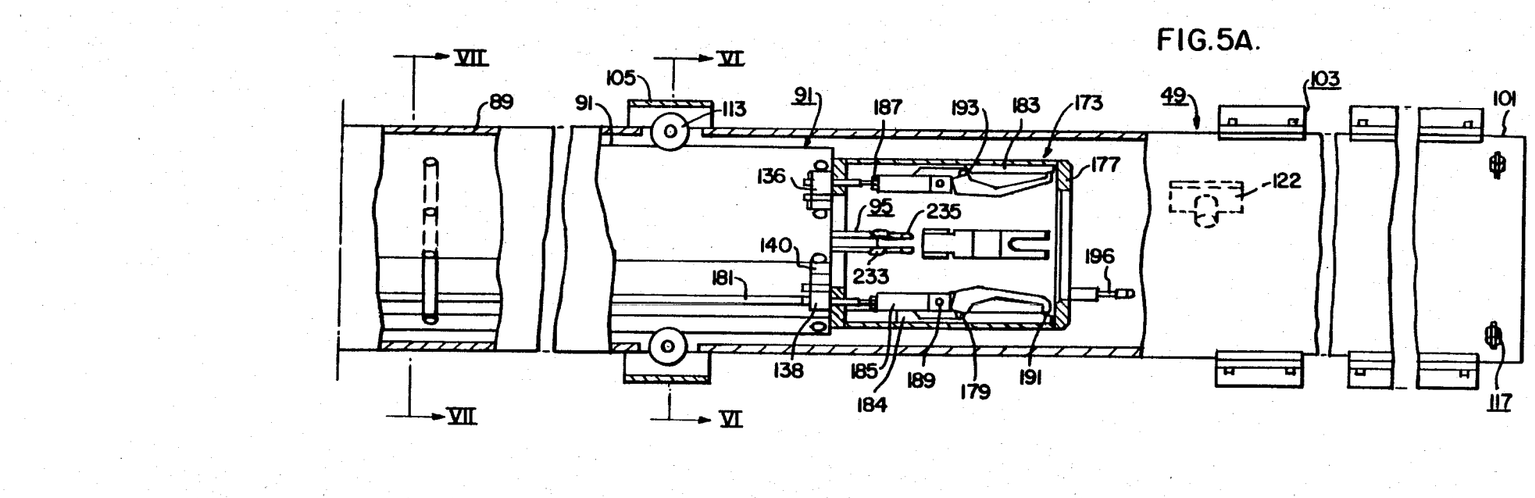
FIGS. 5A, 5B, 5C together constitute a view in side elevation taken in the direction of the arrows V—V of FIG. 6, partly in longitudinal section and with parts of the guiding mast broken away, showing the coordinated assembly for raising component assemblies of the nuclear reactor.
Figure 6:
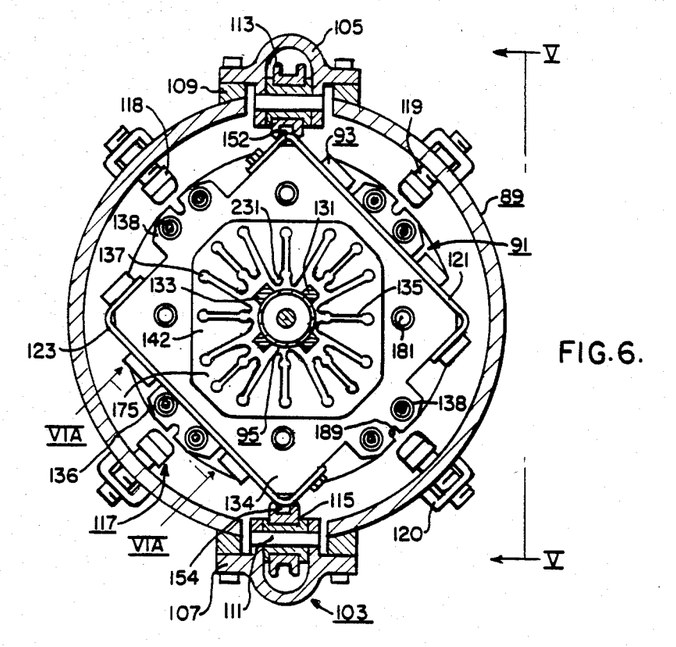
FIG. 6 is a view in transverse section taken along line VI—VI of FIG. 5E.

The guiding mast 89 includes a long hollow cylinder 101 of circular cross section having the ring 87 welded to it at the top. The cylinder 101 is shown as a unitary hollow member. It may also be formed of a plurality of cylindrical sections secured together at abutting external flanges. The guiding mast 89 serves to guide the inner mast 91 which in turn guides the elongated member 95. In addition the guiding mast serves to protect the component assemblies as they are transferred through the water 35 from position to position. To guide the inner mast 91 the guiding mast 89 includes a plurality of pairs of rollers assemblies 103 along its length (FIGS. 5A, 6). The assemblies 103 of each pair are oppositely disposed on the cylinder 101.

Each assembly 103 (FIG. 6) includes a generally U-shaped bracket or roller housing 105 from whose arms flanges 107 extend. The cylinder 101 has openings to accommodate the assemblies 103. Each housing 105 is secured by its flanges 107 on blocks 109 along the boundaries of an opening in cylinder 101 with its arms extending through the opening. A pin 111 extends between each pair of arms. A grooved roller 113, typically with V-grooves, having a bearing 115 is rotatable on the pin 111.

Figure 5B:
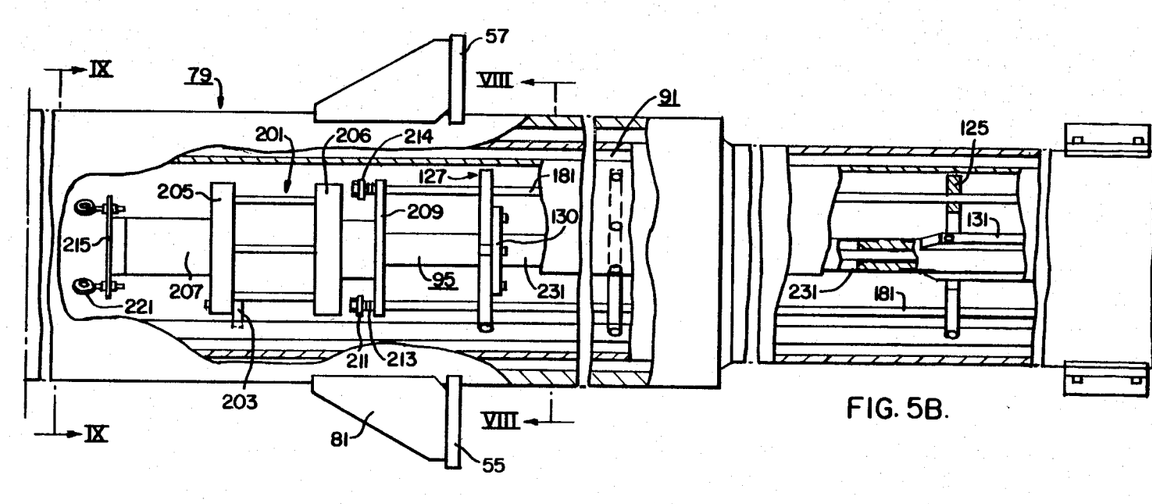
Figure 5C:
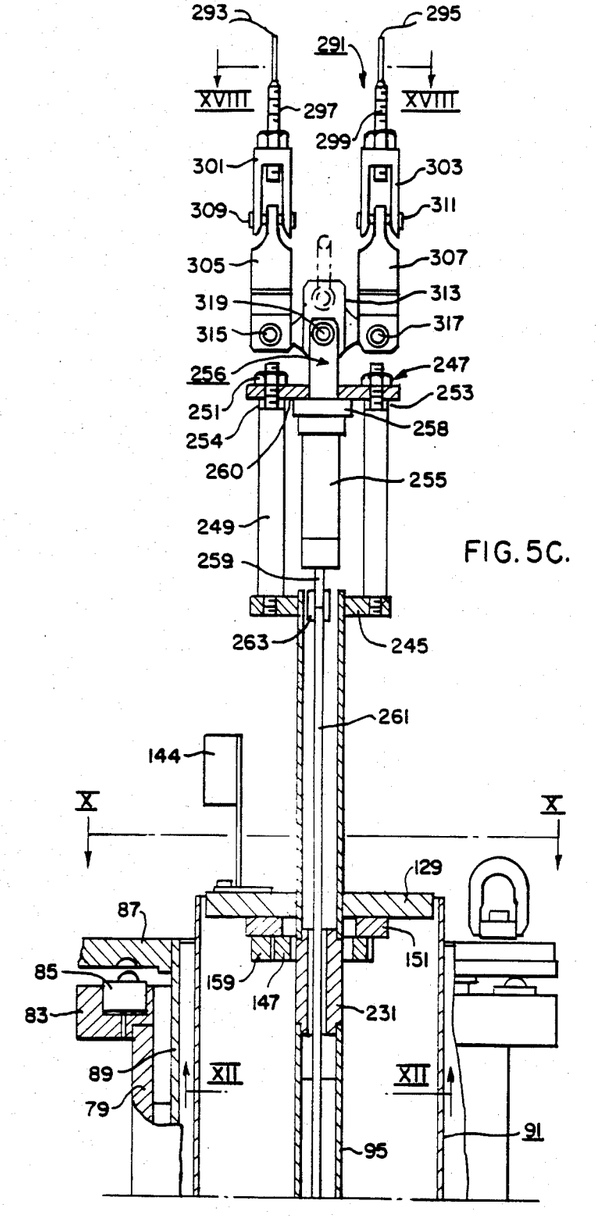
Figure 5D:
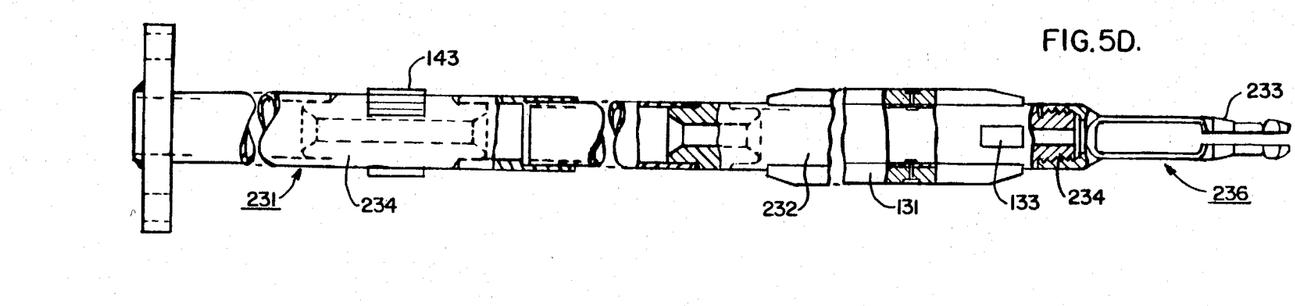
FIG. 5D is a view in side elevation, with parts in longitudinal section showing the elongated member.
Figure 5E:
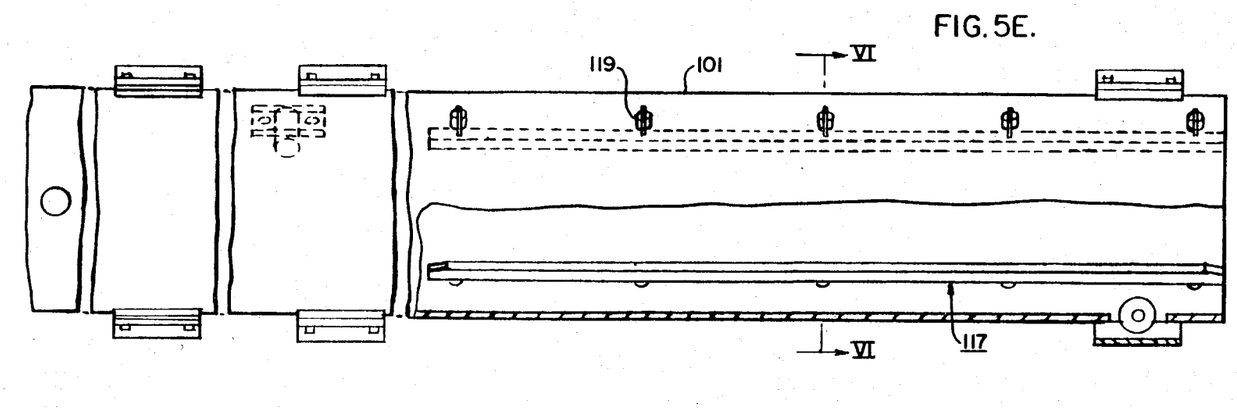
FIG. 5E is a view in side elevation, with a part in longitudinal section, of the lower portion of the guiding mast showing the guide bars.
Figure 13:
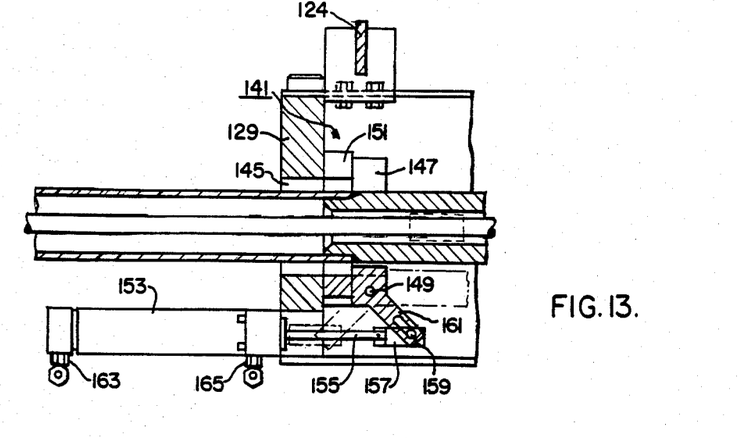
FIG. 13 is a view in transverse section taken along line XIII—XIII of FIG. 10.

Near its lower end the mast 89 is provided with guide bar assemblies 117 (FIGS. 5E, 6). There are typically four assemblies 117, two each being displaced by 45° on each side of the roller assemblies 103 on the periphery of the hollow cylinder 101. Each assembly 117 includes a bar 118 held by threaded sleeves 119 which pass through holes in the cylinder 101. At its outer end each sleeve 119 has a transverse slot. After the bars are secured to the sleeves and properly positioned, the assembly 117 is fixed by U-brackets 120 which engage the slots in the sleeves 119 and are welded externally to the cylinder 101. Near its lower end but above the guide bar assemblies 117, the cylinder 101 has a stop 122 (FIG. 5A). This stop is engageable with a stop plate 124 (FIGS. 10, 13) which extends from the inner mast 91 near its upper end. The stop 122 and plate 124 limit the vertical movement of the mast 91.

The inner mast 91 (FIGS 2, 5B, 5C, 6, 13) is a rigid structure in the form of a rectangular parallelopiped formed of oppositely disposed channels 121 and 123 bolted to generally rectangular plates along the lengths of the channels. The inner mast 91 is guided by the grooved rollers 113 along the guiding mast 89. Opposite corners 152 and 154 (FIG. 6) formed between the web and one flange of each channel 121, 123 engage the grooves in the roller 113 so that the inner mast is moved in a stable manner firmly anchored in the rollers.

Figure 2:
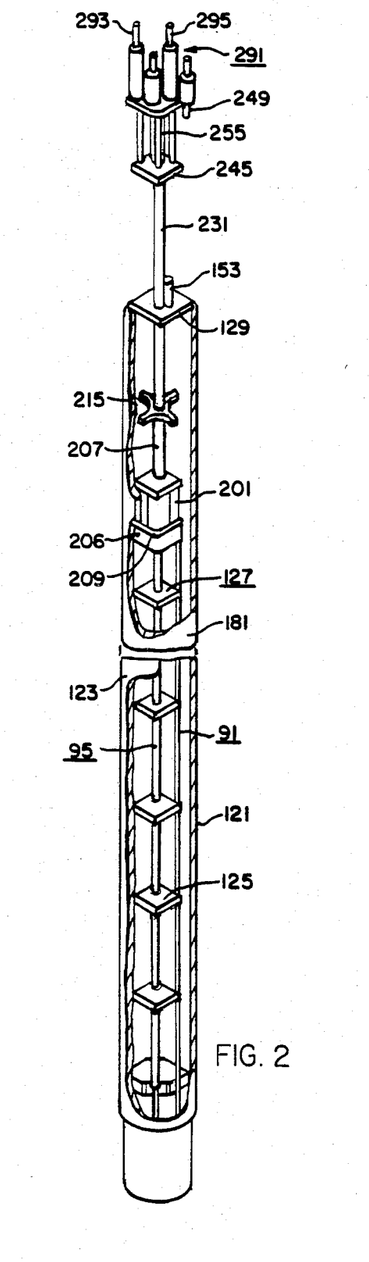
FIG. 2 is a view in perspective showing the inner mast and the elongated member and certain of the other parts with which the inner mast and elongated member cooperate.
Figure 7:
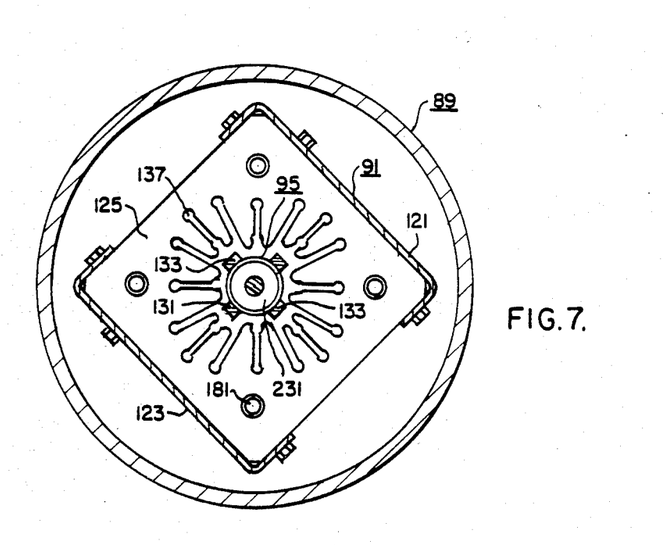
FIG. 7 is a view in transverse section taken along line VII—VII of FIG. 5A.
Figure 8:
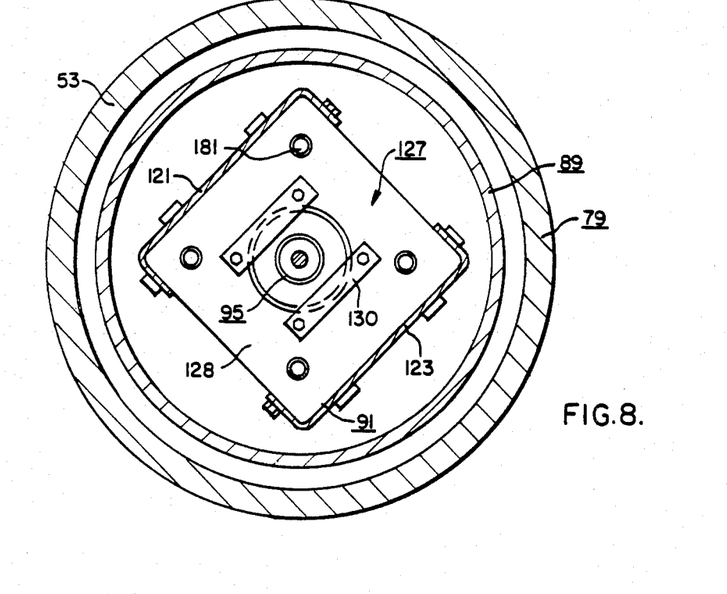
FIG. 8 is a view in transverse section taken along line VIII—VIII of FIG. 5B.
Figure 9:
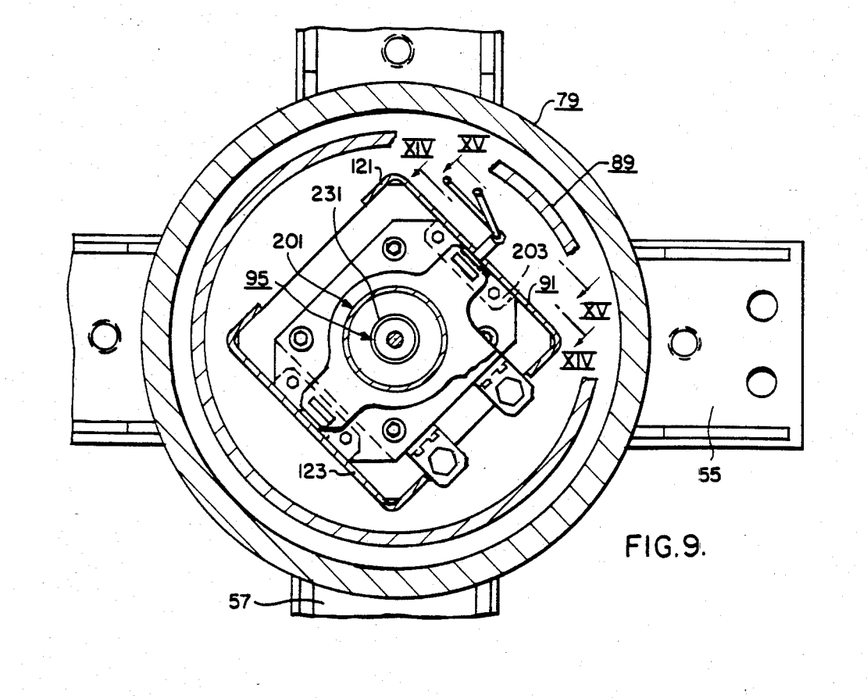
FIG. 9 is a view in transverse section taken along line IX—IX of FIG. 5B.

The plates which form the rigid structure with the channels 121, 123 are of several types. There are a plurality of plates 125 (FIG. 7) usually referred to as "snow flakes", a stop-plate assembly 127 (FIG. 2), a bottom plate 134 (FIG. 6) and a top plate 129 (FIGS. 2, 5C).

The "snow-flake" plates 125 have central openings (FIG. 6) through which the elongated member 95 is capable of passing. Oppositely disposed rectangular openings are in communication with the central openings. These rectangular openings are spaced about 90° around the periphery of the radial openings. Two of these openings which are opposite to each other permit the passage of guide strips 131 attached to the elongated member 95 for guiding a fuel assembly connected to the inner mast 91. The other two openings permit the passage of lugs 133 (herein referred to as secondary lugs) which engage the stop-plate assembly 127 to raise the inner mast 91 into the guiding mast 89 after a control-rod assembly 97 has been raised. There are also radial slot-like openings 135 for passing the vanes (not shown) from which the control rods (not shown) are suspended and the control rods themselves. The control rods pass through generally-circular expansions 137 in the radial openings.

The stop-plate assembly 127 (FIG. 8) includes a plate 128 having a hole through which the elongated member 95 with its secondary lugs 133 and primary lugs 143 is passed during assembly. Strips 130 are secured across the holes. These strips are engageable with the secondary lugs 133.

Figure 6A:
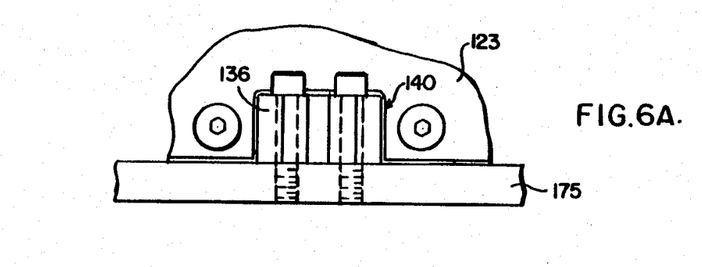
FIG. 6A is a fragmental view in side elevation as seen from the direction VIA—VIA of FIG. 6.

The bottom plate 134 (FIG. 6) has a generally rectangular opening 142 with rounded corners. Pairs of ears 136 and 138 extend centrally from the sides of the bottom plate. The ears of each pair are symmetrically disposed on each side of a center line through the plate 134. The pair of ears 136 extend through openings 140 (FIGS. 5A, 6A) in the sides of the channels 121 and 123.

Figure 3:
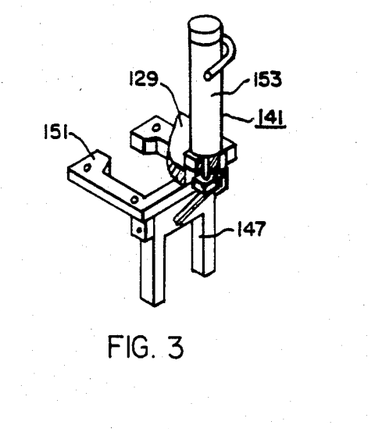
FIG. 3 is a fragmental view in perspective showing the selectably-actuable mechanism, which controls the interconnection between the inner mast and the elongated member, in the open position.
Figure 3A:
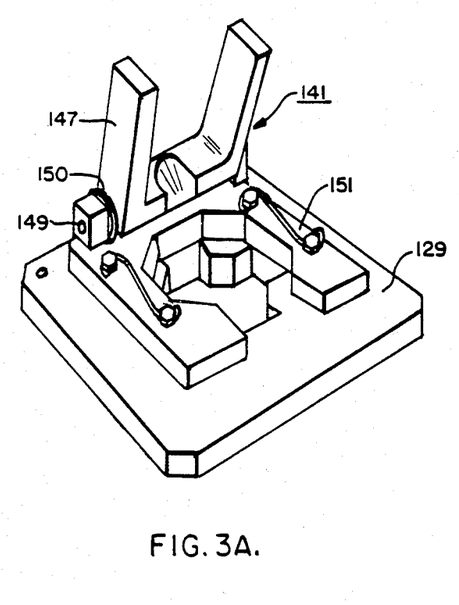
FIG. 3A is a copy of a photograph of this selectably-actuable mechanism in the open position as seen looking upwardly along the inner mast.
Figure 12:
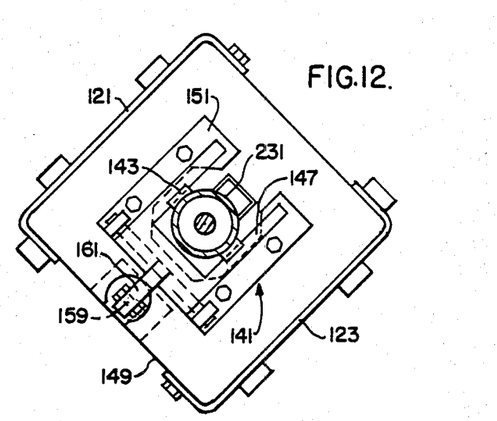
FIG. 12 is a view in transverse section taken along line XII—XII of FIG. 5C.

The upper plate 129 (FIGS. 1A, 3A) is cooperatively connected to the yoke assembly 141 which controls the mechanical interconnection of the inner mast 91 and the elongated member 95. The elongated member 95 has an additional set of external diametrically projecting lugs 143 FIG. 12 (herein primary lugs) in addition to the secondary lugs 133. These primary lugs 143 project from the upper part of member 95. The plate 129 has an opening 145 which is dimensioned to pass the lugs 143 if it is not obstructed. The passage of the lugs 143 may be obstructed by closing of the yoke assembly 141. A terminal box 144 is supported on plate 129.

Figure 4:
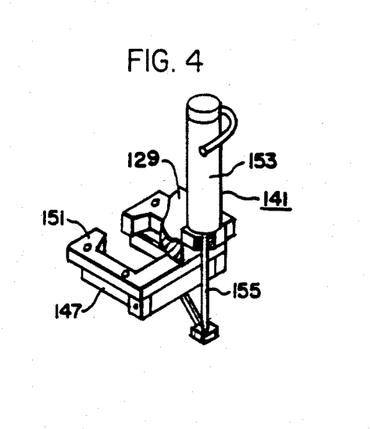
FIG. 4 is a fragmental view in perspective of this mechanism in the closed position.
Figure 11:
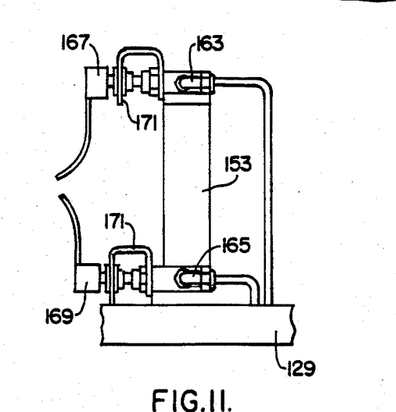
FIG. 11 is a fragmental view in side elevation as seen from the direction XI—XI of FIG. 10.

The yoke assembly 141 (FIGS. 3, 3A, 4, 5C, 8, 10, 12, 13) includes a yoke 147 below the plate 129. The yoke 147 is pivotal on a shaft 149 whose bearings 150 are in a generally U-shaped bracket 151 secured to the under surface of the top plate 129. A fluid cylinder 153 (FIGS. 14, 13), typically an air cylinder, is mounted centrally near one end of the plate 129. The piston rod 155 of the cylinder 153 extends downwardly through a hole in the plate 129. This rod 155 carries at its end a clevis 157 which carries a pin 159. The pin engages a slot in a linkage 161. The linkage is integral with the yoke 147 at its center. The cylinder 153 has inlets 163 and 165 through which air is injected to cause its piston (not shown) and the piston rod 155 to move downwardly or upwardly. With the piston rod 155 in the down position, the yoke 147 extends across the opening 145. In this position the yoke is in the path of the lugs 143 so that upward movement of the elongated member 95 results in raising of the inner mast 91 and in addition the mast is prevented from dropping. The apparatus is shown in this closed setting in FIGS. 4, 12 and 13 (full lines). With the piston and rod 155 in the upward position, the yoke 147 is out of the path of the lugs 143 and the elongated member 95 alone is raised. The yoke assembly 141 is shown in this open setting in FIGS. 3, 3A and in dash-dot lines in FIG. 13. Limit switches 167 and 169 are suspended from brackets 171 at the top and bottom of cylinder 153 (FIG. 11). These limit switches are selectively actuated by plungers in dependence upon the position of the piston (not shown) in cylinder 153 and are connected to convey intelligence of the position of the piston.

A gripper housing 173 for the fuel assembly grippers is bolted to the ears 136 and 138 of the bottom plate 134 of the inner mast 91 (FIG. 5A). The top of the housing 173 is a "snow-flake" plate 175 (FIG. 6). The bottom of the housing has an opening defined by an inwardly extending run 177. A plurality of grippers 179, suspended from actuator rods 181, extend into the housing. Typically there are four grippers 179, each engaging cam surfaces 183 and 184 on an inner wall of the housing 173. The actuator rod 181 for each gripper 179 has a threaded tip which is adjustably screwed into a bar 185 and locked by a nut 187. The bar 185 has a clevis 189 at its lower end from which the claws of a gripper 179 extend pivotally. The claws are bifurcated having inwardly projecting fingers 191. Each gripper 179 has lobes 193 and one not shown, which engage and are moved laterally by the cam surfaces 183 and 184. The structure and operation of the grippers 179 are the same as in Kowalski. When an actuator rod 181 is moved downwardly, the mechanical reaction of the lobes 193 and the one not shown and cam surfaces 183 and 184 cause the fingers 191 to move inwardly of the axis of the housing 173 through the opening 192 and then outwardly to engage the plates (not shown) of an upper nozzle 194 (FIG. 1) of a fuel assembly 93. To orient the housing 173 appropriately with respect to a fuel assembly, guide pins 196 extend diagonally from the housing 173. When the housing is properly oriented, the pins guide the grippers into holes in the fuel assembly to be processed.

Figure 14:
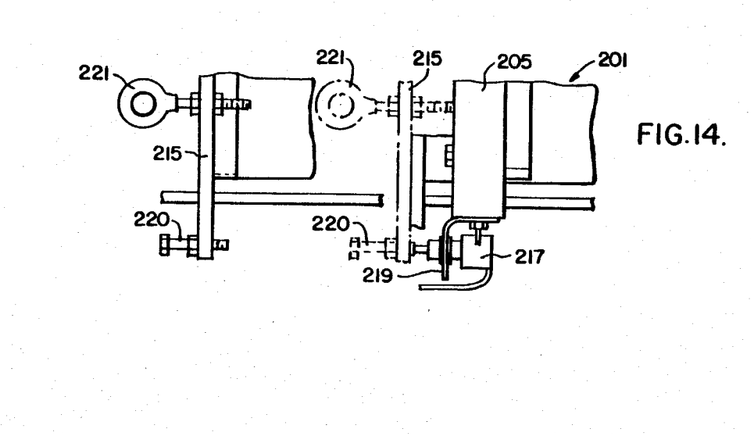
FIG. 14 is a fragmental view in side elevation as seen from the direction XIV of FIG. 9.
Figure 15:
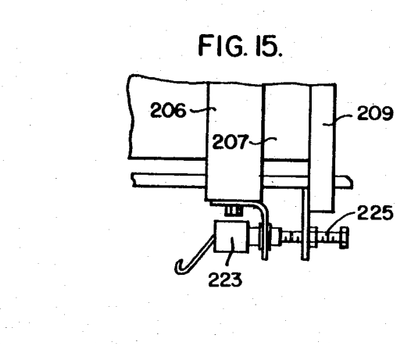
FIG. 15 is a fragmental view in side elevation as seen from the direction XV—XV of FIG. 9.

The actuator rods 181 and the grippers connected to them are driven together by a fluid cylinder 201 typically an air cylinder (FIGS. 2, 5B, 14, 15). The cylinder 201 is supported between the top plate 129 and the stop-assembly 127 by supporting projections 203 from the inner mast 91 (FIGS. 5B, 9) which are bolted to the upper flange 205 of the cylinder. The cylinder 201 has a double-acting piston (not shown) which drives a double-ended piston rod 207. Air for driving the piston downwardly is admitted through an inlet (not shown) in the upper flange 205 and air for driving the piston upwardly is admitted in an inlet (not shown) in the lower flange 206. At its lower end the piston rod 207 carries a plate 209 to whose corners the actuator rods 181 are secured. Each rod is threaded at the top and is engaged by a nut 211 which compresses a spring 213 between a retainer 214 and plate 209 (FIG. 5B). At the top the piston rod 207 carries a pull-out plate 215. A limit switch 217 (FIG. 15) is supported by a bracket 219 secured to the upper flange 205 of the piston. The pull-out plate 215 carries an appropriately positioned screw 220 which actuates the limit switch 217 when the piston rod 207 is in the lowermost position. FIG. 14 shows the plate 215 in the retracted position and, in dash-dot lines, in the position in which it actuates switch 217. The pull-out plate 215 also carries I-bolts 221 which serve to operate the cylinder 201 in the event of failure of air. The lower flange 206 also carries a limit switch 223. This switch 223 is actuable by an appropriately positioned screw 225 on the plate 209. These limit switches 217 and 223 provide intelligence as to the positions of the actuator rods 181 and the grippers 179 carried by them.

The elongated member 95 includes a long tube 231. The tube 231 (FIGS. 5B, 5D, 9) is of composite structure including a plurality of sections 232 secured together by hollow plugs 234 welded between the ends of the sections. The primary lugs 143 are welded to the upper plug 234. The guides 131 are riveted to the lower tube section 232. The lowest plug 234 is threaded at the end. The member 236 carrying the resilient fingers 233 is screwed onto the lowest plug 234.

The tube 231 passes through the fluid cylinder 201 which is hollow at its center and tapers to resilient fingers 233 at the lower end. At their tips the fingers 233 have knobs 235 shaped so that they mate with cavities 237 (FIG. 16) or 239 (FIG. 17) in the stems 241, 243 of control-rod assembly 97 or thimble-plug assembly 99 which are to be raised and transferred by the elongated member 95. The tube 231 is suspended from a rectangular plate 245 (FIG. 5C) having a hole to whose surface the tube 231 is secured. The plate 245 is formed into a rigid mechanical unit with an upper-plate assembly 247 by support rods 249 which are secured in the corners of the rectangular plate 245 and pass through the upper plate 260. There are four rods 249. The upper-plate assembly 247 is secured to the rods 249 between nuts 251 (FIG. 5C), which engage plate 260, and spacers 253 at three rods and connector bracket 254 at the other rod. The upper-plate assembly 247 carries a fluid cylinder 255, typically an air cylinder. The plate 260 and cylinder 255 are supported on a yoke 256 whose shoulder 258 abuts the lower surface of upper plate 260 and whose arms 262 position the plate. The cylinder 255 has a double-acting piston (not shown) which is moved upwardly or downwardly by air admitted to inlets (not shown) carrying with it a piston rod 259. An actuator rod 261 extends through tube 231. The shoulders 258 and plate 260 and cylinder 255 form a rigid unit so that movement up or down of the yoke 256 moves the elongated member 95, including the tube 231 and the actuator rod 261, as a unit.

The piston rod 259 is connected to the actuator rod 261 by coupling 263 and the rod 261 is moved upwardly or downwardly by the piston rod. In the up position of the actuator rod 261, the rod is above the fingers 233. With the rod in this position the fingers are inserted in the stem 241 of the control rod 97 and the stem 243 of the control rod 99. Since the fingers 233 are resilient they are readily thrust into the openings in these stems. Then the piston rod 259 and rod 261 are moved to the lowermost position. In this position the lower end of the rod 261 causes the knob 235 to be seated in the cavity 237 or 239. The control rod assembly 97 or the thimble-plug assembly 99 is then firmly engaged for transfer.

Figures 18, 19:
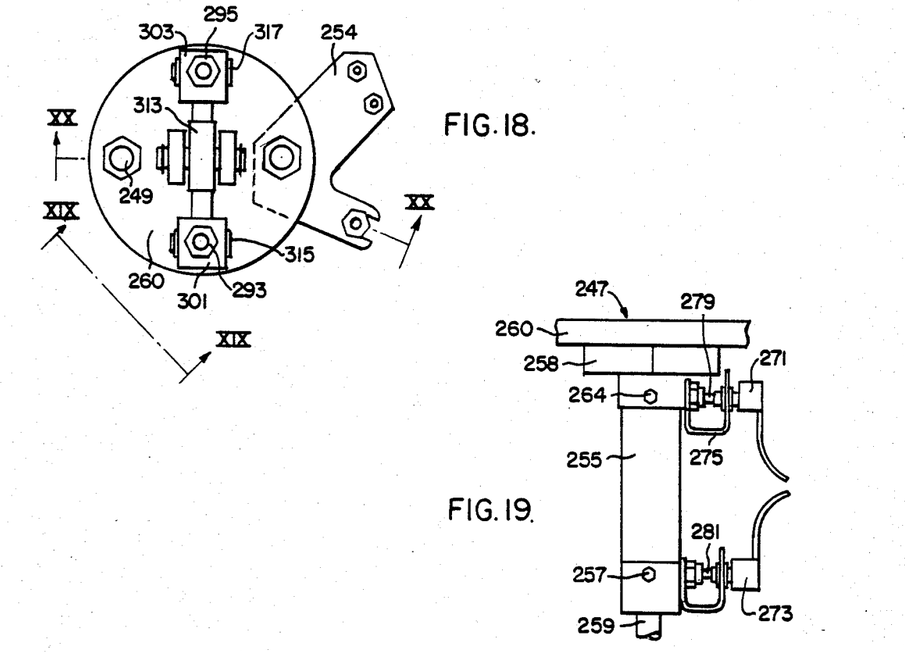
FIG. 18 is a fragmental view in the direction XVIII—XVIII of FIG. 5C.
FIG. 19 is a fragmental view taken in the direction XIX—XIX of FIG. 18.
Figure 20:
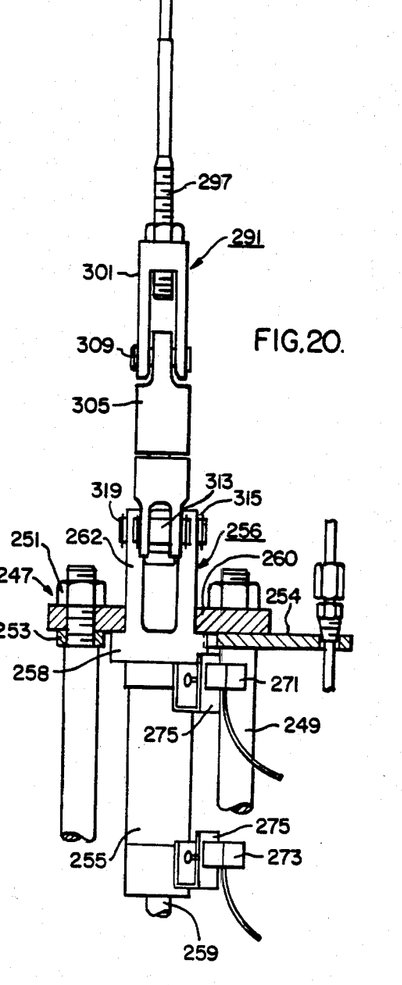
FIG. 20 is a fragmental view in section taken along line XX—XX of FIG. 18.

Limit switches 271 and 273 (FIGS. 19, 20) are suspended on brackets 275 from the upper and lower ends of cylinder 255. The limit switches are actuable by plungers 279 and 281 with the piston (not shown) in the upper and lower position. The switches provide intelligence as to the position of the actuator rod 261.

The winch 61 (FIG. 1) raises and lowers the elongated member through an interconnection assembly 291. The cables 293 and 295 (FIG. 5C) driven by the winch terminate in externally threaded rods 297 and 299 of the assembly 291. Each rod 297 and 299 is secured to a clevis 301 and 303. An underwater swivel 305 and 307 is pivotally suspended from a clevis pin 309 and 311 passing through the legs of each clevis 301 and 303. A yoke 313 extends between pins 315 and 317 between the fingers of the swivels 305 and 307. The yoke 256 is joined to the yoke 313 at the center of the latter by a pin 319 on which the yokes are mutually pivotal.

When the winch 61 is driven it raises or lowers the elongated member 95. The inner mast 91 can be raised or supported by the elongated member with the yoke 147 in the horizontal position as shown in FIG. 5C or in full lines in FIG. 13.

At the start of an operation the lower end of the inner mast 91 is engaged with the core at the position where component assemblies are to be transferred. The inner mast 91 and elongated member 95 are properly oriented by rotating the outer mast 53 and the mast 91 and elongated member 95 attached to it. It a fuel assembly 93 is to be transferred the yoke 147 is set in the closed position shown in FIG. 4. The cylinder 201 is then actuated to lower the actuator rods 181 and the grippers 179. The grippers 179 engage the upper nozzle 194 of fuel assembly 93. The winch 61 is then energized to raise the elongated member 95 in turn raising the inner mast 91 and the assembly 93. The assembly may then be transferred. The yoke 147 is retained in the position shown in FIG. 4 and after the transfer, the inner mast is again placed on a core where another transfer is to take place. If a control-rod assembly 97 is to be transferred, the yoke 147 is set in the open position shown in FIG. 3. The winch 61 is actuated to raise the elongated member and the control-rod assembly. After the assembly is raised to a predetermined height in the inner mast 91, the raising of the elongated member continues. The lugs 133 engage the stop 127 raising the inner mast into the guiding mast 89. The transfer may now be carried out. When the lowering operation is to take place, the inner mast is lowered until its lower end engages the top of the fuel assembly. The yoke 147 is maintained open and the elongated member 95 is lowered until the control rods are fully inserted in the fuel assembly. Then the yoke is closed.

When a plug assembly 99 is to be transferred, the mast assembly is lowered so that the inner mast 91 rests on the top of the core or on the top of a storage rack (not shown). The yoke 147 is at this stage maintained close. The elongated member 95 is lowered until the fingers 233 engage the thimble-plug assembly. The elongated member 95 is then raised. As the elongated member is raised, the thimble-plug assembly enters the gripper housing 173. At this position the primary lugs 143 engage the closed yoke 147 and the inner mast 91 and the elongated member 95 and the thimble-plug assembly are raised together.

While a preferred embodiment of this invention has been disclosed herein, many modifications thereof are feasible. This invention is not to be restricted except insofar as is necessitated by the spirit of the prior art.

We claim:

1. Apparatus for transferring component assemblies of a nuclear reactor, including fuel assemblies, control-rod assemblies, thimble-plug assemblies, poison assemblies and the like, to and from said nuclear reactor or from one position to another position within said reactor, the said transfer being carried out in a water-filled pit within which the reactor is disposed, the said apparatus including a supporting bridge suspended over said pit, a coordinated assembly supported by said bridge and extending into said pit for engaging and selectively disposing said component assemblies for transfer, and means, connected to said bridge and to said coordinated assembly, for selectively positioning said coordinated assembly to engage and dispose said component assemblies, the said coordinated assembly including an external guiding mast, an inner mast within said guiding mast movable vertically relative to said guiding mast, the said inner mast including means, selectively actuable, to engage and disengage a fuel assembly, means, connected to said engaging-and-disengaging means, for actuating said engaging-and-disengaging means to engage or disengage a fuel assembly, an elongated member within said inner mast vertically movable relative to said inner mast and to said guiding mast, the said elongated member including additional engaging-and-disengaging means for engaging and disengaging those of said component assemblies other than a fuel assembly, means, connected to said additional engaging-and-disengaging means, for actuating said engaging-and-disengaging means to engage or disengage a said other component assembly, drive means, connected to said elongated member, for raising and lowering said elongated member, primary projection means on said elongated member, and means, on said inner mast, selectively actuable between a first position in which it is engageable by said primary projection means to render said drive means operable to raise both said elongated member and said inner mast, and a second position in which said selectively-actuable means is not engageable by said primary projection means to render said drive means operable to raise only said elongated member, whereby with said selectively-actuable means in said first position, said fuel assembly may be raised into said guiding mast and with said selectively-actuable means in said second position, a said component assembly other than said fuel assembly may be raised into said guiding mast.

2. The apparatus of claim 1 including additional projection means on the elongated member below the primary projection means and a stop on the inner mast above said additional projection means, said additional projection means being so spaced from said primary projection means and from said stop as to engage said stop and advance said second mast into the guiding mast after said elongated means has raised a component assembly attached thereto to a predetermined raised position in said guiding mast.

3. The apparatus of claim 1 wherein the guiding mast includes internally extending grooved guiding rollers for the inner mast and the inner mast is of generally polygonal cross section having corners along the length thereof, the said corners engaging the grooves in said rollers to guide said inner mast within said guiding mast.

4. The apparatus of claim 1 wherein the guiding mast includes internally extending guiding means for the inner mast and the inner mast includes a pair of channel members and means for mounting said members with the flanges of one facing the flanges of the other and with the corners defined by their flanges and webs outwardly, the said corners engaging the guiding means so as to be guided thereby.

5. The apparatus of claim 1 wherein the actuating means for the engaging-and-disengaging means of the inner mast includes a fluid actuable cylinder mounted within the inner mast and having a piston rod connected to said engaging-and-disengaging means to actuate said means to engage or disengage a fuel assembly, said fluid cylinder being hollow having an internal opening through which the elongated member passes.

6. The apparatus of claim 1 wherein the elongated member has guiding means along the lower portion thereof for guiding a fuel assembly being raised or lowered by the inner mast.

7. The apparatus of claim 1 wherein the inner mast is a unitary hollow elongated member having at the end thereof the fuel assembly engaging-and-disengaging means.

8. Apparatus for transferring component assemblies of a nuclear reactor, including fuel assemblies, control-rod assemblies, thimble-plug assemblies, poison assemblies and the like, to and from said nuclear reactor or from one position to another position within said reactor, the said transfer being carried out in a water-filled pit within which the reactor is disposed, the said apparatus including a supporting bridge suspended over said pit, a coordinated assembly supported by said bridge and extending into said pit for engaging and selectively disposing said component assemblies for transfer, and means, connected to said bridge and to said coordinated assembly, for selectively positioning said coordinated assembly to engage and dispose said component assemblies, the said coordinated assembly including an external guiding mast, an inner mast within said guiding mast movable vertically relative to said guiding mast, the said inner mast including means, selectively actuable to engage and disengage a fuel assembly, means connected to said engaging-and-disengaging means, for actuating said engaging-and-disengaging means to engage or disengage a fuel assembly, an elongated member within said inner mast vertically movable relative to said inner mast and to said guiding mast, the said elongated member including additional engaging-and-disengaging means for engaging and disengaging those of said component assemblies other than a fuel assembly, mean, connected to said additional engaging-and-disengaging means, for actuating said engaging-and-disengaging means to engage or disengage a said other component assembly, drive means, connected to said elongated member, for raising and lowering said elongated member, primary projection means on said elongated member, and means, on said inner mast, selectively actuable between a first position in which it is engageable by said primary projection means to render said drive means operable to raise both said elongated member and said inner mast, and a second position in which said selectively-actuable means is not engageable by said primary projection means to render said drive means operable to raise only said elongated member, whereby with said selectively-actuable means in said first position, said fuel assembly may be raised into said guiding mast and with said selectively-actuable means in said second position, a said component assembly other than said fuel assembly may be raised into said guiding mast, said selectively-actuable means including a plate, mounted on said inner mast, having an opening whose cross-sectional area is such that said elongated member and said primary-projection means may readily pass therethrough, said selectively-actuable means also including a yoke pivotally mounted on said plate and means for moving said yoke between a first position in which it is interposed at said opening in the path of said primary projection means, so as to obstruct the movement of said elongated member alone and a second position in which it is not interposed at said opening in the path of said primary projection means so as to permit movement of said primary member alone.

* * * * *